(12) United States Patent
Zenk

(10) Patent No.: US 12,024,210 B2
(45) Date of Patent: Jul. 2, 2024

(54) DRIVE CONTROLLER OF A RAIL VEHICLE

(71) Applicant: SIEMENS MOBILITY GMBH, Munich (DE)

(72) Inventor: Ralph Zenk, Groebenzell (DE)

(73) Assignee: Siemens Mobility GmbH, Munich (DE)

( * ) Notice: Subject to any disclaimer, the term of this patent is extended or adjusted under 35 U.S.C. 154(b) by 665 days.

(21) Appl. No.: 17/257,626

(22) PCT Filed: Jun. 5, 2019

(86) PCT No.: PCT/EP2019/064562
§ 371 (c)(1),
(2) Date: Jan. 4, 2021

(87) PCT Pub. No.: WO2020/007556
PCT Pub. Date: Jan. 9, 2020

(65) Prior Publication Data
US 2021/0171068 A1 Jun. 10, 2021

(30) Foreign Application Priority Data
Jul. 3, 2018 (DE) .......................... 102018210926.5

(51) Int. Cl.
*B61C 17/12* (2006.01)
*B61L 15/00* (2006.01)

(52) U.S. Cl.
CPC ............ *B61C 17/12* (2013.01); *B61L 15/009* (2013.01)

(58) Field of Classification Search
CPC ....... B61C 17/12; B61L 15/009; Y02T 10/72; G05G 1/04; G05G 9/04; B60L 15/20

USPC .......................................................... 701/19
See application file for complete search history.

(56) References Cited

U.S. PATENT DOCUMENTS

| 2003/0014322 A1 | 1/2003 | Kreidler et al. |
| 2004/0100938 A1* | 5/2004 | Aiken, II ................ B61L 3/127 |
| | | 370/346 |
| 2007/0144297 A1 | 6/2007 | Gotthardt et al. |
| 2016/0001799 A1* | 1/2016 | Cook ....................... B61C 3/00 |
| | | 105/35 |

FOREIGN PATENT DOCUMENTS

| CN | 1527984 A | 9/2004 |
| CN | 106560368 A | 4/2017 |
| CN | 107933583 A | 4/2018 |

(Continued)

OTHER PUBLICATIONS

Jones, Bradley; Sakimura, JSON Web Signature (JWS), Internet Engineering Task Force (IETF), , May 2015, ISSN: 2070-1721.

*Primary Examiner* — Isaac G Smith
(74) *Attorney, Agent, or Firm* — Laurence A. Greenberg; Werner H. Stemer; Ralph E. Locher

(57) ABSTRACT

A rail vehicle, such as a power car or a locomotive, has a drive and brakes, and a drive controller for controlling the drive and the brakes of the rail vehicle. An operating device for the drive controller has a device for modifying the operating mode of the rail vehicle. The operating device has an operating lever, which can be operated by an operator of the rail vehicle, for operating the drive controller. In order to simplify the operation of the rail vehicle, the function of the operating lever is dependent on the operating mode of the rail vehicle.

11 Claims, 3 Drawing Sheets

(56) References Cited

FOREIGN PATENT DOCUMENTS

| | | | |
|---|---|---|---|
| DE | 102006034125 B3 | 2/2008 | |
| DE | 60314951 T2 | 4/2008 | |
| DE | 102009025552 A1 | 12/2010 | |
| DE | 102009025553 A1 | 12/2010 | |
| EP | 1396375 A1 | 3/2004 | |
| JP | 2003079009 A | 3/2003 | |
| KR | 101146338 B1 | 5/2012 | |
| RU | 183794 U1 | 10/2018 | |
| WO | WO-2008009443 A1 * | 1/2008 | ............. B61C 17/12 |
| WO | WO2008009443 A1 | 1/2008 | |
| WO | WO-2010145949 A2 * | 12/2010 | ............. B61C 17/12 |

* cited by examiner

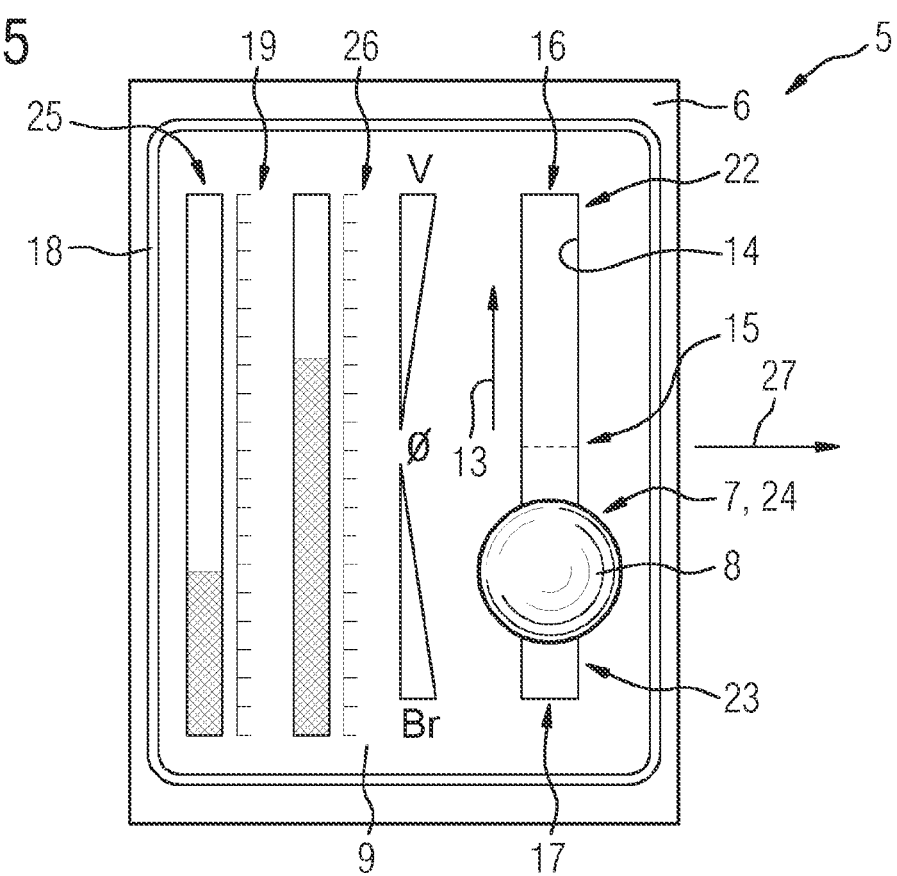

DRIVE CONTROLLER OF A RAIL VEHICLE

BACKGROUND OF THE INVENTION

Field of the Invention

The invention relates to a rail vehicle, in particular a power car (multiple unit) or a locomotive. The invention further relates to an operating facility for a drive controller of a rail vehicle. Moreover, the invention relates to a method for operating a drive controller of a rail vehicle.

In rail vehicles, different operating philosophies and systems for driving and braking are used. The operating facility in the driver's cab of the vehicle typically comprises several operating levers, which are used to control driving and braking functions. Moreover, the vehicle can be operated in different operating modes, such as for example in the "driving/braking" operating mode or in the "tractive force specification/speed specification" operating mode.

The operating mode of the rail vehicle is usually set by the vehicle driver on the basis of the timetable and further railway-specific framework conditions. Furthermore, the vehicle driver can select a suitable driving speed on certain track sections.

In modern vehicles, an automatic speed controller (ASC) is used as a special on-board facility. The task of the ASC is to accelerate or brake the rail vehicle to a setpoint speed ($V_{setpoint}$) preselected by the vehicle driver or permitted by the trackside equipment, and to maintain this speed. To this end, the vehicle driver can specify a speed by means of a $V_{setpoint}$ actuator. The ASC then automatically sets the required tractive or brake forces. When such an ASC is used, one of the operating levers of the operating facility in the driver's cab of the vehicle serves as the $V_{setpoint}$ actuator.

The vehicle driver can also select another operating mode, in which the tractive force or the brake force is specified manually. In this case, the permitted driving speed is maintained through the manual adjustment of the tractive or brake forces. For this purpose, a further operating lever of the operating facility in the driver's cab of the vehicle is embodied as a combined driving/braking lever. This enables the desired tractive or brake force to be specified.

The switchover between different operating modes usually takes place via additional operating elements of the operating facility, such as for example mechanical buttons, or via a touch display, for example integrated in an operator console, with which a virtual switch is realized. Depending on the design of the operating facility, it can occur in certain operating modes of the vehicle that only selected operating levers are required for operating the drive controller, while other operating levers of the operating facility are temporarily functionless.

Further operating levers can be provided for activating the different brake systems of the rail vehicle, such as for example the hydraulic or pneumatic brakes or the electrodynamic brakes.

A rail vehicle known from the prior art comprises driving means and braking means as well as a drive controller for controlling the driving means and braking means in order to influence the driving speed of the rail vehicle. The rail vehicle further comprises an operating facility for the drive controller, wherein the operating facility comprises means for changing the operating mode of the rail vehicle. Moreover, the operating facility comprises an operating lever which can be used by the vehicle driver of the rail vehicle to operate the drive controller.

SUMMARY OF THE INVENTION

An object of the present invention is to simplify the operation of rail vehicles. This object is achieved by means of the subject matter of the independent claims. Advantageous embodiments of the invention are set out in the subclaims.

The advantages and embodiments described below in relation to the rail vehicle according to the invention and the operating facility according to the invention also apply correspondingly to the method according to the invention and vice versa.

A core idea of the invention is accordingly to design the drive controller of the rail vehicle in such a way that the function of the operating lever for the drive controller is dependent on the selected, current operating mode of the rail vehicle. In other words, the operating lever fulfills different functions, depending on the operating mode.

The invention proposes a reduction in the number of operating levers required through the use of a multifunctional operating lever. Here, the function of the operating lever changes according to the selected operating mode, in other words its meaning for the operation of the drive controller changes. The use of such an operating lever with a functional switchover makes it possible to reduce the number of operating elements required to operate a rail vehicle. As a result, the material costs are reduced and the outlay for the wiring, commissioning and maintenance of the operating elements is lowered. With the help of the invention, it is furthermore possible to exclude a situation where operating levers of the operating facility are temporarily functionless. As a result, both the structure of the operating facility and its operation can be simplified.

A key aspect of the invention is that each operating mode switchover also forces a change of function of the operating lever. In other words, the change of operating mode is always associated with a change of function of the operating lever. This preferably takes place in such a way that a functionless state of the operating lever is avoided at all times.

In a particularly preferred embodiment of the invention, the operating principle of the operating lever remains unchanged despite its different functions for the drive controller. There is therefore no need for the vehicle driver to learn different operating concepts.

The change of function of the operating lever depending on the operating mode preferably relates exclusively to the meaning of the signals transmitted from the operating element to the drive controller for their use in controlling the driving and braking means. In other words, only the meaning of the signals generated by the operating lever changes. By contrast, the operating principle, in other words the way in which the operating lever is operated, preferably remains unchanged. In other words, in a preferred embodiment of the invention, the function of the operating lever changes while its functionality is retained. The operating principle of the operating lever, in other words the way in which it is operated, remains unchanged despite its different functions for the drive controller. There is therefore no need for the vehicle driver to learn different operating concepts.

Moreover, it is particularly advantageous if the operating lever itself serves to change the operating mode and thus to change its own function. The need for a separate switchover element is then eliminated and the operating facility is further simplified.

The above-described characteristics, features and advantages of this invention, as well as the manner in which these are realized, will become clearer and more readily understandable in connection with the following description of the exemplary embodiments, which are explained in more detail in conjunction with the drawings.

BRIEF DESCRIPTION OF THE SEVERAL VIEWS OF THE DRAWING

FIG. 5 shows a top view of the operator console from FIG. 2 in a second operating mode (second variant, second lever position).

DETAILED DESCRIPTION OF THE INVENTION

Figure 1:
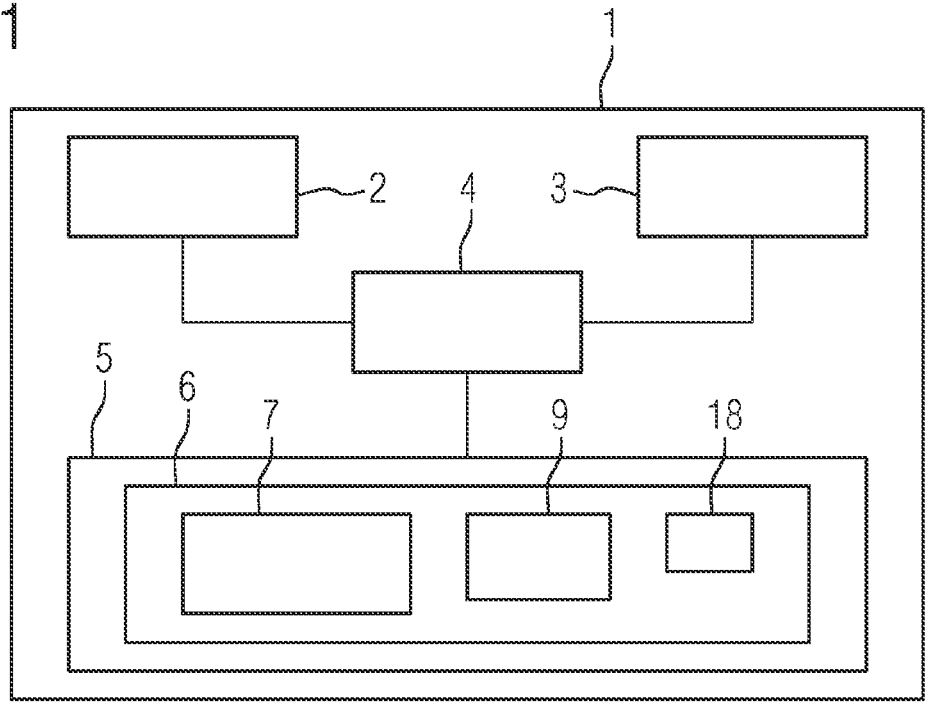
FIG. 1 shows a schematic representation of the invention.

All the figures simply show the invention schematically and with its essential constituent parts. Identical reference characters here correspond to elements of identical or comparable function.

A rail vehicle 1, here a locomotive, has suitable driving means 2 and braking means 3 for driving and braking the rail vehicle 1 as well as a drive controller 4 for controlling the driving means 2 and braking means 3 in order to influence the driving speed of the rail vehicle 1. In the driver's cab (not shown) of the locomotive 1, there is an operating facility 5 for the drive controller 4. The operating facility 5 comprises an operator console 6 with an operating lever 7, which can be operated by the vehicle driver, for operating the drive controller 4. In the illustrated example, the operating lever 7 has a hand grip 8 on its free end. The operating lever 7 can also be embodied as a joystick and/or have any ergonomic shape. The shaft (not shown) of the operating lever 7 is connected to a sensor apparatus (not shown) of the drive controller 4, which detects the movement and/or position of the operating lever 7 and generates corresponding control signals for the driving and braking means 2, 3.

A display device 9 assigned to the operating lever 7 is provided directly adjacent to the operating lever 7 in the operator console 6, for example in the form of an electronic display. In an alternative embodiment, a display device 9 can also be embodied as part of the operating lever 7 itself (not shown).

The operating unit 5 comprises means for changing the operating mode of the rail vehicle 1 from the "driving/braking" operating mode into the "tractive force specification/speed specification" operating mode and back. In the case shown here, the operating lever 7 itself serves to change the operating mode and thus to change its own function, as explained in more detail below.

Input signals for the drive controller 4 can be generated by actuating the operating lever 7. The drive controller 4 uses these input signals to control the driving and braking means 2, 3. Here, the meaning of these input signals for controlling the driving and braking means 2, 3 depend on the selected, current operating mode of the locomotive 1. This means that the function of the operating lever 7 depends on the operating mode. Depending on the selected operating mode of the locomotive 1, the input signals transmitted from the operating lever 7 to the drive controller 4, which signals are dependent on the movement of the operating lever 7, thus represent different kinds of input variables for the drive controller 4 with regard to their meaning for controlling the driving and braking means 2, 3. In other words, these input signals are used in different ways, depending on the operating mode. The type of the signals transmitted from the operating lever 7 to the drive controller 4, which signals are dependent on the lever movement, is however identical in all cases. Only the meaning that the drive controller 4 assigns to the received signals differs, as does the subsequent processing of these signals by the drive controller 4.

The operating lever 7 can therefore optionally be used as a speed selector 11 for setting the setpoint speed ($V_{setpoint}$) or as a combined driving/braking lever 12. In accordance with the two relevant operating modes, the two function modes of the operating lever 7 are on the one hand the function as speed selector (speed setpoint actuator) and on the other hand the function as tractive force/brake force selector.

The operating lever 7 can be moved in a first movement direction 13 in order to generate input signals for the drive controller 4. This operating movement preferably takes place along a first axis. In the illustrated example, the operating lever 7 can be moved linearly in a guide plate 14 of the operator console 6.

Here, the movement of the operating lever 7 takes place in mutually exclusive operator actions, such as for example acceleration and braking, in opposite directions, in other words for example starting from a neutral position 15, in this case the center position between the frontmost position 16 and the rearmost position 17, forward or backward (upward and downward in the drawing) in the guide plate 14. The guide plate 14 is designed in such a way that the operating lever 7 engages in the neutral position 15 on account of a spring-supported latching facility, but can be moved out of the neutral position 15 in both directions along the first axis by overcoming the latching forces.

Lighting means 18 are also provided, for example using LED technology, which illuminate at least parts of the operating lever 7 and/or parts of the operator console 6 supporting the operating lever 7 in different colors, depending on the selected operating mode and/or depending on the current function of the operating lever 7. By way of such colored illumination of the operating lever 7 or of the console 6, the selected operating mode and thus the set function of the operating lever 7 are indicated to the vehicle driver quickly and reliably.

The display 9, which is located directly adjacent to the operating lever 7, is preferably a color display. It also indicates the selected operating mode and/or the current function of the operating lever 7, preferably by a corresponding color selection of the display. Setpoint and actual values 19 of relevant operational data or messages, such as fault messages, and operational indications can additionally be shown on this display, so that further operating levers or display devices for operating the drive controller 4 are not necessarily required. An operating unit, comprising the operating lever 7 and the assigned display device 9, would be sufficient in combination with the drive controller 4 for the driving operation of the locomotive 1.

Figure 2:
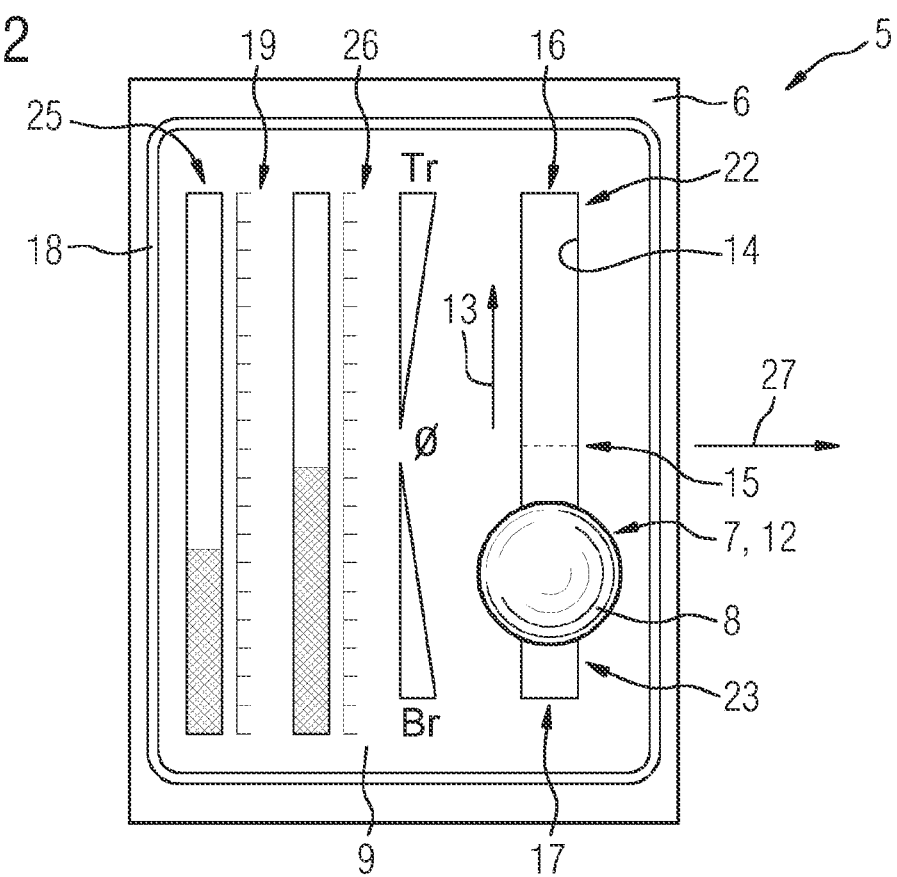
FIG. 2 shows a top view of an operator console of the drive controller in a first operating mode.

An operator console 6 with an integrated display 9 and operating lever 7 is shown in FIG. 2 by way of example. The operating lever 7 serves as the driving/braking lever 12. The operating lever 7 and the display are illuminated for example entirely in yellow. The operating lever 7 can be moved out of a neutral position 15 linearly along an axis, forward (upward in the drawing) or backward (downward in the drawing) in the guide plate 14. Here, a first movement region 22 is provided for the operating lever 7 between the neutral position 15 and the frontmost position 16 and a corresponding tractive force display is provided in a first display region 25. A second display region 26 for the brake force display is assigned to the movement of the operating lever 7 in a second movement region 23, which lies between the neutral position 15 and the rearmost position 17.

Figure 3:
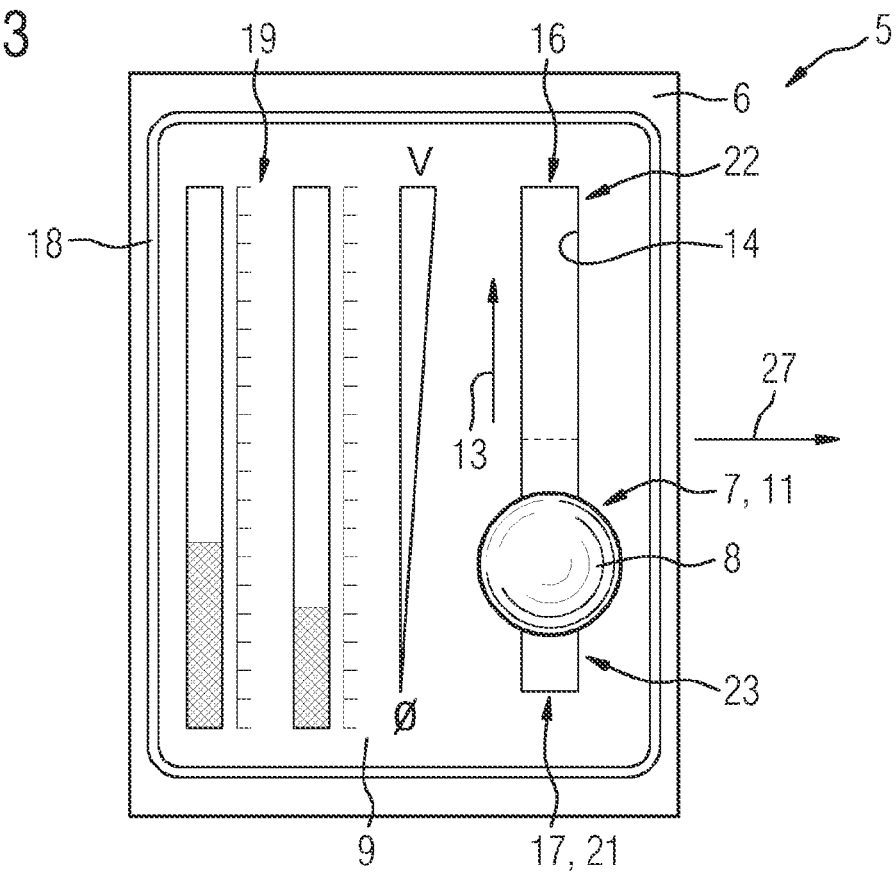
FIG. 3 shows a top view of the operator console from FIG. 2 in a second operating mode (first variant)

The same operating lever 7 is also shown in FIG. 3. Once the operating mode has been switched over, however, the operating lever 7 serves as the speed setpoint actuator 11. The color blue, for example, is used for the lighting 18 and the indication on the display 9.

Even though no center position of the operating lever 7 is provided and the rearmost position 17 of the operating lever 7 serves as the neutral position 21, the functionality (operability) of the operating lever 7 is nevertheless unchanged, in other words the operating movement takes place in the guide plate 14 along the first axis from a rearmost position 17 into a frontmost position 16 and back. However, the operating signals transmitted from the operating lever 7 to the drive controller 4 have a different meaning and are accordingly processed differently by the drive controller 4.

Figure 4:
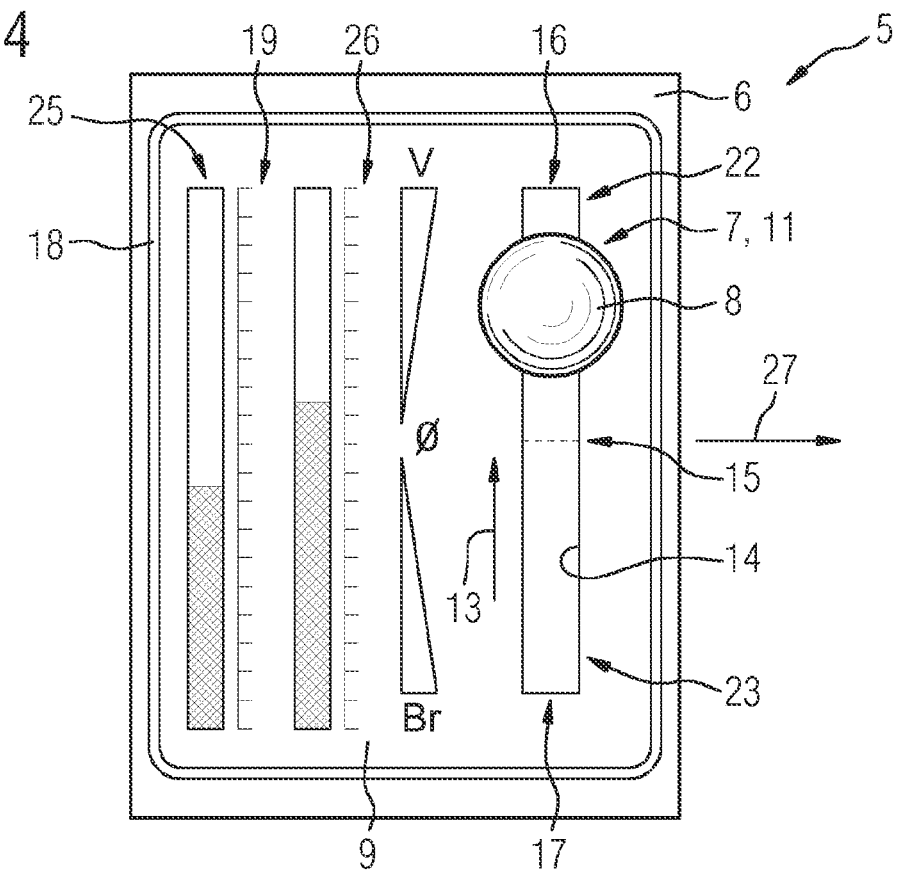
FIG. 4 shows a top view of the operator console from FIG. 2 in a second operating mode (second variant, first lever position).

An alternative operating principle of the operating lever 7 following switchover of the operating mode is shown in FIGS. 4 and 5. Here, the operating lever 7 serves as the speed setpoint actuator 11 (FIG. 4) in a first movement region 22 along its operating movement direction 13, namely between the neutral position 15 and the frontmost position 16 of the operating lever 7, and as the brake force selector 24 (FIG. 5) in a second movement region 23 along its operating movement direction 13, namely between the neutral position 15 and the rearmost position 17 of the operating lever 7. In this case, a manual brake intervention is also possible at any time, even when the operating lever 7 serves as the speed selector 11.

The first movement region 22 and the corresponding speed setpoint display in the first display region 25, which is assigned to the first movement region 22 of the operating lever 7, are illuminated for example in blue, while the second movement region 23 and the corresponding brake force display in the second display region 26, which is assigned to the second movement region 23 of the operating lever 7, are illuminated for example in yellow. As shown in the example in FIG. 2, the center position 15 of the operating lever 7 is embodied as the neutral position.

To change the operating mode, the operating lever 7 can be moved in a second movement direction 27 which differs from the first movement direction 13. This switchover movement preferably takes place along a second axis. In the examples shown, the second movement direction 27 runs perpendicularly to the first movement direction 13. In other words, the switchover movement is preferably a linear movement, which is executed transversely to the guide plate 14. The switchover movement, in other words the movement of the operating lever 7 to change the operating mode, is preferably independent from the current function of the operating lever 7 depending on the operating mode, in other words is always the same.

Moreover, the operating lever 7 can only be moved out of a defined lever position in this second movement direction 27, wherein the operating lever 7 can be brought into this switchover position by way of a movement in the first movement direction 13. In the examples according to FIG. 2 and FIG. 4, 5, the switchover can only take place from the neutral position (center position) 15. The switchover between the different operating modes and thus simultaneously the function switchover for the operating lever 7 thus takes place by way of a sideways movement of the operating lever 7 out of its neutral position 15, as a result of which a switchover contact (not shown) connected to the drive controller 4 is actuated.

Because the neutral position of the operating lever 7 is preferably embodied as a latching position, the latching position regularly represents the switchover position from which the operating lever 7 can complete the switchover movement. Depending on the embodiment of the operating lever function, it is then possible if required to change (displace) the position of the latching position in the event of a change of operating mode and the associated function switchover of the operating lever 7. This change of position can take place for example with the help of an electromechanical switchover apparatus (not shown), which can be used to move the latching position from a first switchover position, for example the center position 15, into another desired switchover position along the guide plate 14, for example into the rearmost position 17 of the operating lever 7 (neutral position 21).

Alternatively, the switchover can also take place in other (arbitrary) positions of the operating lever 7, as for example in the example according to FIG. 3, albeit preferably only if this does not result in any undesired states. This is ensured through the use of suitable software, which checks the possibility that undesired states may arise and if necessary blocks the manual switchover of the operating mode insofar as this is to take place at a specific point in time and/or from a specific position.

As an alternative to a switchover between the functions by way of a movement of the operating lever 7 itself, it can also be provided for the switchover to take place with the help of an additional switch (not shown), which is provided in or on the operating lever 7 or in the operator console 6 in the driver's cab of the locomotive 1 in which the operating lever 7 is installed.

In one exemplary case, the vehicle driver initially works with a combined driving/braking lever 7, 12 while performing a shunting operation. After leaving the station area, the vehicle driver changes the operating mode by activating the ASC. The switchover of the operating mode is performed with the operating lever 7. The operating lever 7, which previously served as the tractive/brake force selector 12 for manually selecting the tractive force, now functions as the speed setpoint selector 11. The commands of the vehicle driver are detected via the operating lever 7 and passed as signals to the drive controller 4.

The invention also relates to the described operating facility 5 for a drive controller 4 and to the drive controller 4 with such an operating facility 5 as well as to a method for operating such a drive controller 4.

Although the invention has been illustrated and described in detail using the preferred exemplary embodiment, the invention is not limited to the disclosed examples and other variants can be derived therefrom by the person skilled in the art without departing from the scope of protection of the invention.

LIST OF REFERENCE CHARACTERS

1 Rail vehicle, locomotive
2 Driving means

3 Braking means
4 Drive controller
5 Operating facility
6 Operator console
7 Operating lever
8 Hand grip
9 Display device, display
(not allocated)
11 Speed selector
12 Combined tractive/brake force selector
13 First movement direction
14 Guide plate
15 Neutral position, center position
16 Frontmost position
17 Rearmost position
18 Lighting means
19 Indicated values
20 (not allocated)
21 Neutral position
22 First movement region
23 Second movement region
24 Brake force selector
25 First display region
26 Second display region
27 Second movement direction

The invention claimed is:

1. A rail vehicle, comprising:
a drive and a brake;
a drive controller for controlling said drive and said brake of the rail vehicle;
an operating facility for said drive controller, said operating facility including a device for changing an operating mode of the rail vehicle;
said operating facility including an operating lever to be used by a vehicle driver of the rail vehicle to operate said drive controller;
said operating lever controlling either said drive or said brake in dependence on the operating mode of the rail vehicle, wherein an actuation of said operating lever generates input signals for said drive controller, and a meaning of the input signals for controlling the drive and the brake depends on the operating mode of the rail vehicle; and
said operating lever being movably mounted in a first movement direction for operating said drive controller and in a second movement direction, which runs perpendicular from the first movement direction, for changing the operating mode.

2. The rail vehicle according to claim 1, wherein said operating lever is configured to selective use as a speed selector for setting a setpoint speed of the rail vehicle or as a combined driving/braking lever.

3. The rail vehicle according to claim 1, wherein said operating lever is movable out of a defined lever position in the second movement direction.

4. The rail vehicle according to claim 3, wherein the defined lever position can be assumed by the operating lever by way of a movement in the first movement direction.

5. The rail vehicle according to claim 1, wherein said operating facility comprises a lighting device for illuminating at least parts of said operating lever and/or parts of an operator console supporting said operating lever, in dependence on a selected operating mode of said operating lever.

6. The rail vehicle according to claim 1, wherein said operating facility comprises a display device configured to indicate a selected operating mode of said operating lever.

7. The rail vehicle according to claim 1, being a power car or a locomotive.

8. An operating facility for a drive controller of a rail vehicle, the rail vehicle having driving means and braking means, the drive controller serving to control the driving means and the braking means to influence a driving speed of the rail vehicle, the operating facility comprising:
a device for changing an operating mode of the rail vehicle;
an operating lever to be used by a vehicle driver of the rail vehicle to operate the drive controller, the drive controller selectively controlling either the driving means or the braking means according to said operating lever depending on the operating mode of the rail vehicle, wherein an actuation of said operating lever generates input signals for said drive controller, and a meaning of the input signals for controlling the drive and the brake depends on the operating mode of the rail vehicle; and
said operating lever being movably mounted in a first movement direction for operating said drive controller and in a second movement direction, which runs perpendicular from the first movement direction, for changing the operating mode.

9. The operating facility according to claim 8, configured to operating a power car or a locomotive.

10. A method for operating a drive controller of a rail vehicle, the rail vehicle having driving means and braking means, and the drive controller serving to control the driving and braking means to influence a driving speed of the rail vehicle, the method comprising:
providing an operating facility for the drive controller, the operating facility including a device for changing an operating mode of the rail vehicle;
using the device of the operating facility to change an operating mode of the rail vehicle;
providing the operating facility with an operating lever to be used by the vehicle driver of the rail vehicle to operate the drive controller, wherein an actuation of said operating lever generates input signals for said drive controller, and a meaning of the input signals for controlling the drive and the brake depends on the operating mode of the rail vehicle;
moving the operating lever in a first movement direction for operating the drive controller and in a second movement direction, which runs perpendicular from the first movement direction, for changing the operating mode; and
selectively controlling either the driving means or the braking means with the drive controller according to the operating lever in dependence on the operating mode of the rail vehicle.

11. The method according to claim 10, wherein the rail vehicle is a power car or a locomotive.

* * * * *